B. B. Whaley,
Molders' Flask-Pin.
Nº 47,059. Patented Mar. 28, 1865.

Witnesses.
James G. Morgan
John A. Palmer.

Inventor.
Barnett B Whaley

UNITED STATES PATENT OFFICE.

BARNETT B. WHALEY, OF BROOKLYN, NEW YORK.

IMPROVED FLASK-PIN.

Specification forming part of Letters Patent No. 47,059, dated March 28, 1865.

*To all whom it may concern:*

Be it known that I, BARNETT B. WHALEY, of the city of Brooklyn, county of Kings, and State of New York, have invented a new and useful Improvement in Flask-Pins for Molders' Flasks; and I do hereby declare that the following is a full and exact description thereof, reference being had to the accompanying drawings, and to the letters of reference marked thereon.

It is found in practice that flasks for casting metal warp and spring while in use, thereby preventing the pins from fitting into their sockets. It is also found that screws of iron used about flasks soon rust, and hence are often rendered of little value for adjustments.

The object of this invention is to remedy these difficulties.

The nature of my invention consists in making flask-pins in two parts, one part being screwed fast to one of the divisions of the flask and the other part being movable, the two being fastened together by a strong screw passing through a slot in the movable one and screwing into the other one, the joining surfaces of the two parts being constructed in the form of inclined planes, and combined in such a manner that, by sliding the movable part forming the pin or spindle on the other part, the spindle will be carried nearer to or farther from the flask, as may be necessary, to make the spindle fit its socket, which is fastened to the other division of the flask. I also insert a piece of brass or some other metal that will not easily rust into one part of the flask-pin to form the nut, and use a brass screw to secure the two parts of the flask-pin together.

To enable others skilled in the art to make and use my invention, I will now proceed to describe its construction and operation.

Figure 1:
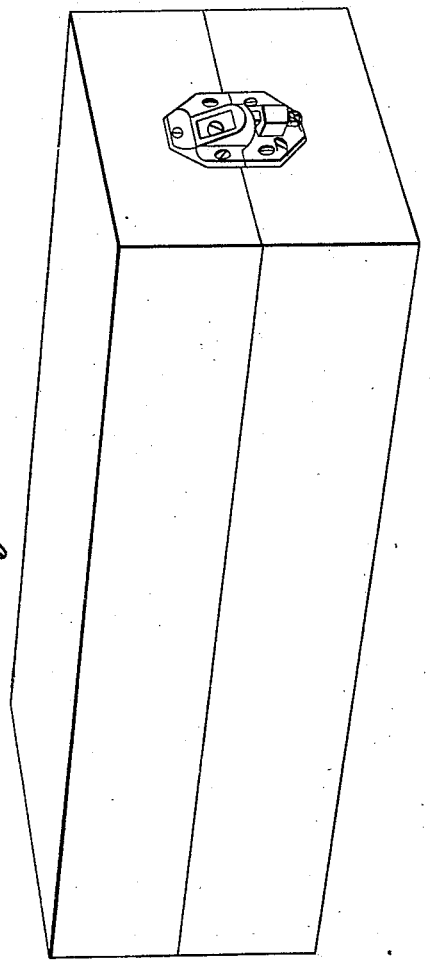
Figure 4:
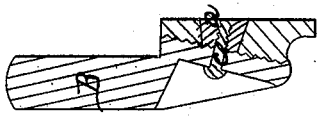
Figure 3:
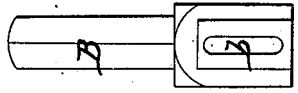
Figure 2:
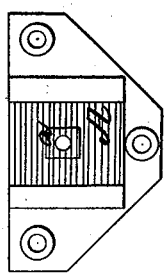

Figure 1 of the drawings represents a flask with the pin, and its socket attached to one end. Fig. 2 is a view of the portion of the pin fastened to the flask, the movable part being shown by Fig. 3. Fig. 4 is a section of both parts of the pin screwed together.

A represents the inclined plane of the fixed part of the pin. $a$ is a nut of brass inserted in this part. B is the spindle of the pin; $b$, a slot, through which the screw $c$ passes. The surfaces of the two parts are corrugated, as shown in Fig. 4, to prevent them from slipping when properly adjusted. The two parts of the pin are made of iron, except the nut $a$ and screw $c$, these being of brass or of some metal not easily rusted.

The operation of adjusting the pin to its socket is as follows, to wit: Supposing the upper portion of the flask (represented by Fig. 1) to have expanded to such an extent as to prevent the spindle B of the pin from fitting into its socket (should the flask be opened) on attempting to close the flask, then the screw $c$ is to be loosened, and the movable portion of the pin is to be slipped along in the proper direction till the spindle will fit its socket, when the screw $c$ is to be tightened.

I claim—

An adjustable flask-pin constructed with two inclined planes so arranged that by moving one of the planes upon the other the spindle of the pin can be adjusted to fit its socket in the manner and for the purpose set forth.

BARNETT B. WHALEY.

Witnesses:
JAMES G. MORGAN,
J. A. PALMER.